United States Patent
Verma et al.

(10) Patent No.: US 11,727,913 B2
(45) Date of Patent: Aug. 15, 2023

(54) AUTOMATICALLY ASSOCIATING CONTEXT-BASED SOUNDS WITH TEXT

(71) Applicant: Adobe Inc., San Jose, CA (US)

(72) Inventors: Gaurav Verma, Bangalore (IN); Vishwa Vinay, Bangalore (IN); Sneha Chowdary Vinjam, Hyderabad (IN); Siddharth Sahay, Secunderabad (IN); Mitansh Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 784 days.

(21) Appl. No.: 16/725,716

(22) Filed: Dec. 23, 2019

(65) Prior Publication Data

US 2021/0193109 A1 Jun. 24, 2021

(51) Int. Cl.
| | | |
|---|---|---|
| *G10L 15/16* | (2006.01) | |
| *G10L 13/033* | (2013.01) | |
| *G10L 13/00* | (2006.01) | |
| *G06F 16/35* | (2019.01) | |
| *G10L 13/08* | (2013.01) | |
| *G06F 3/0482* | (2013.01) | |
| *G06F 3/16* | (2006.01) | |
| *G10L 13/047* | (2013.01) | |

(52) U.S. Cl.
CPC ............ *G10L 13/00* (2013.01); *G06F 3/0482* (2013.01); *G06F 3/167* (2013.01); *G06F 16/358* (2019.01); *G10L 13/047* (2013.01); *G10L 13/08* (2013.01)

(58) Field of Classification Search
CPC .... G06F 3/0483; G06F 3/0488; G06F 40/166; G06F 40/169; G06F 3/0482; G06F 15/0291; G06F 3/167; G06F 16/40; G06F 3/0481; G06F 40/205; G06F 16/5846; G06F 40/103; G06F 3/04842; G10L 2021/105; G10L 21/10; G10L 2015/088
See application file for complete search history.

(56) References Cited

U.S. PATENT DOCUMENTS

| | | | | |
|---|---|---|---|---|
| 9,305,530 | B1 * | 4/2016 | Durham | G10L 25/45 |
| 10,372,991 | B1 * | 8/2019 | Niemasik | G06F 16/583 |
| 10,482,177 | B2 * | 11/2019 | Hahn | G06F 40/211 |

(Continued)

OTHER PUBLICATIONS

Beltr et al, "Semantic text recognition via visual question answering", Sep. 2019, In2019 International Conference on Document Analysis and Recognition Workshops (ICDARW) Sep. 22, 2019 (vol. 5, pp. 97-102). IEEE.*

(Continued)

*Primary Examiner* — Olujimi A Adesanya
(74) *Attorney, Agent, or Firm* — FIG. 1 Patents

(57) ABSTRACT

A sound association system identifies one or more aurally active words in digital text. Aurally active words refer to words that denote particular sounds. Context-based sounds corresponding to the one or more aurally active words are also identified. Each context-based sound is anchored to or associated with the corresponding one or more aurally active words and is played back when the digital text is played back or read, providing context-based background sounds associated with the one or more aurally active words. For example, a context-based sound can be played back at a higher volume when the one or more aurally active words are played back or read, and at a lower volume when other words of the digital text are played back or read.

20 Claims, 9 Drawing Sheets

(56) References Cited

U.S. PATENT DOCUMENTS

| | | | | |
|---|---|---|---|---|
| 10,963,781 | B2* | 3/2021 | Barkan | G06F 16/639 |
| 11,282,509 | B1* | 3/2022 | Li | G06F 16/65 |
| 2008/0140411 | A1* | 6/2008 | Millman | G09B 5/062 |
| | | | | 704/270 |
| 2010/0050064 | A1* | 2/2010 | Liu | G06F 40/279 |
| | | | | 715/202 |
| 2012/0196260 | A1* | 8/2012 | Nhiayi | G09B 5/06 |
| | | | | 434/317 |
| 2013/0145241 | A1* | 6/2013 | Salama | G06F 40/103 |
| | | | | 715/202 |
| 2014/0038154 | A1* | 2/2014 | Brownlow | G09B 5/06 |
| | | | | 434/317 |
| 2014/0189501 | A1* | 7/2014 | Demiralp | G06F 40/279 |
| | | | | 715/764 |
| 2014/0210855 | A1* | 7/2014 | Cohen | G06F 16/40 |
| | | | | 345/633 |
| 2015/0042662 | A1* | 2/2015 | Latorre-Martinez | G06T 13/80 |
| | | | | 345/473 |
| 2015/0261747 | A1* | 9/2015 | Goldstein | G06F 3/167 |
| | | | | 715/202 |
| 2019/0057688 | A1* | 2/2019 | Black | G06N 20/00 |
| 2019/0172443 | A1* | 6/2019 | Shechtman | G10L 13/047 |
| 2019/0259378 | A1* | 8/2019 | Khadloya | G06N 3/045 |
| 2019/0347523 | A1* | 11/2019 | Rothberg | G06N 3/0454 |
| 2019/0384981 | A1* | 12/2019 | Swaminathan | G06K 9/6293 |
| 2020/0251115 | A1* | 8/2020 | Farinelli | G06N 3/08 |
| 2020/0410283 | A1* | 12/2020 | Ramachandra Iyer | |
| | | | | G06F 40/289 |
| 2021/0151034 | A1* | 5/2021 | Hasan | G10L 15/16 |
| 2022/0093082 | A1* | 3/2022 | Zou | G06F 40/284 |
| 2022/0115034 | A1* | 4/2022 | Krishnan Gorumkonda | |
| | | | | G06F 3/167 |

OTHER PUBLICATIONS

Huang et al, "Multimodal network embedding via attention based multi-view variational autoencoder", Jun. 2018, InProceedings of the 2018 ACM on international conference on multimedia retrieval Jun. 5, 2018 (pp. 108-116).*

Beltran et al, "Semantic text recognition via visual question answering", Sep. 2019, In2019 International Conference on Document Analysis and Recognition Workshops (ICDARW) Sep. 22, 2019 (vol. 5, pp. 97-102). IEEE.*

Arandjelovic,"Look, Listen and Learn", Aug. 1, 2017, 14 pages.

Bahdanau,"Neural Machine Translation by Jointly Learning to Align and Translate", In Journal of Computing Research Repository, Sep. 2014, 15 pages.

Devlin,"BERT: Pre-Training of Deep Bidirectional Transformers for Language Understanding", May 24, 2019, 16 pages.

Fonseca,"Freesound Datasets: A Platform for the Creation of Open Audio Datasets", Oct. 2017, pp. 486-493.

Fonseca,"Learning Sound Event Clasasifiers from Web Audio with Noisy Labels", Mar. 7, 2019, 6 pages.

Gemmeke,"Audio Set: An Ontology and Human-Labeled Dataset for Audio Events", Mar. 2017, 5 pages.

Harte,"Detecting Harmonic Change in Musical Audio", Oct. 27, 2006, 5 pages.

Hershey,"CNN Architectures for Large-Scale Audio Classification", Jan. 10, 2017, 5 pages.

Jiang,"Music Type Classification by Spectral Contrast Feature", Feb. 2002, 4 pages.

Lu,"Automatic Mood Detection and Tracking of Music Audio Signals", IEEE Transactions on Audio, Speech, and Language Processing, vol. 14, No. 1, Available at <http://ieeexplore.ieee.org/stamp/stamp.jsp?tp=&arnumber=1561259&isnumber=33144>, Jan. 2006, pp. 5-18.

Mikolov,"Efficient estimation of word representations in vector space", arXiv preprint arXiv:1301.3781 (2013), Sep. 7, 2013, 12 pages.

Pennington,"GloVe: Global Vectors for Word Representation", EMNLP. vol. 14. 2014., Sep. 2014, 12 pages.

Vijayakumar,"Sound-Word2Vec: Learning Word Representations Grounded in Sounds", Aug. 29, 2017, 6 pages.

West,"Features and Classifiers for the Automatic Classification of Musical Audio Signals", Jan. 2004, 6 pages.

Zhou,"Attention-Based Bidirectional Long Short-Term Memory Networks for Relation Classification", Aug. 2016, pp. 207-212.

* cited by examiner

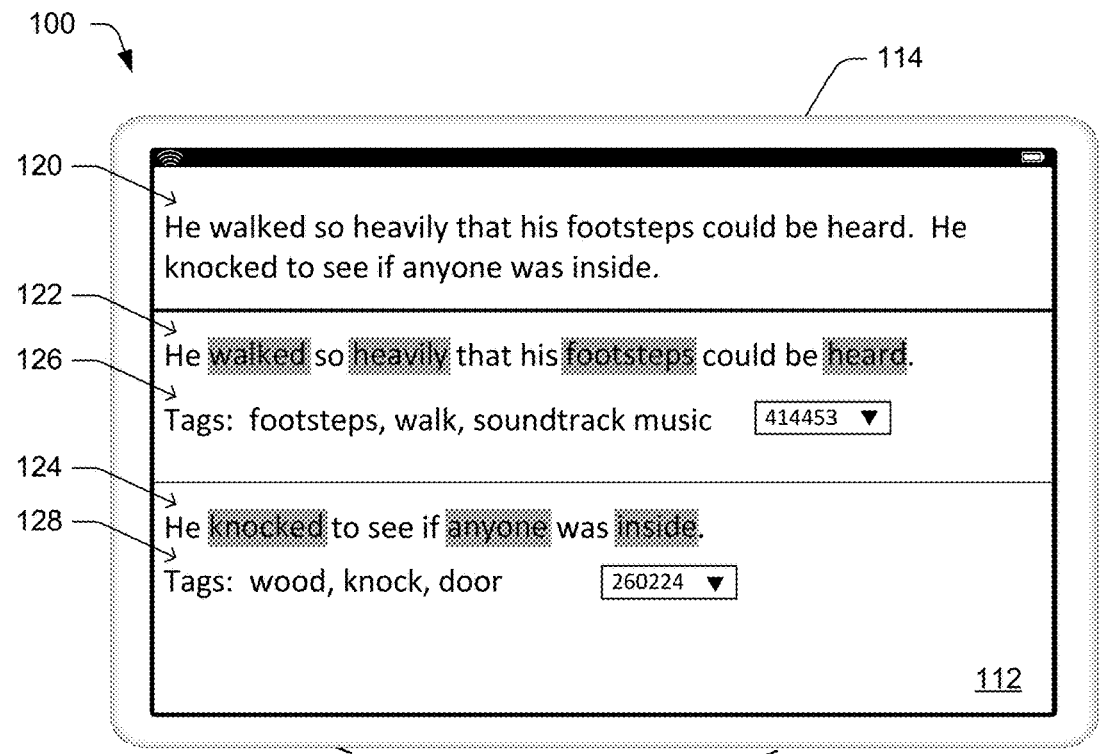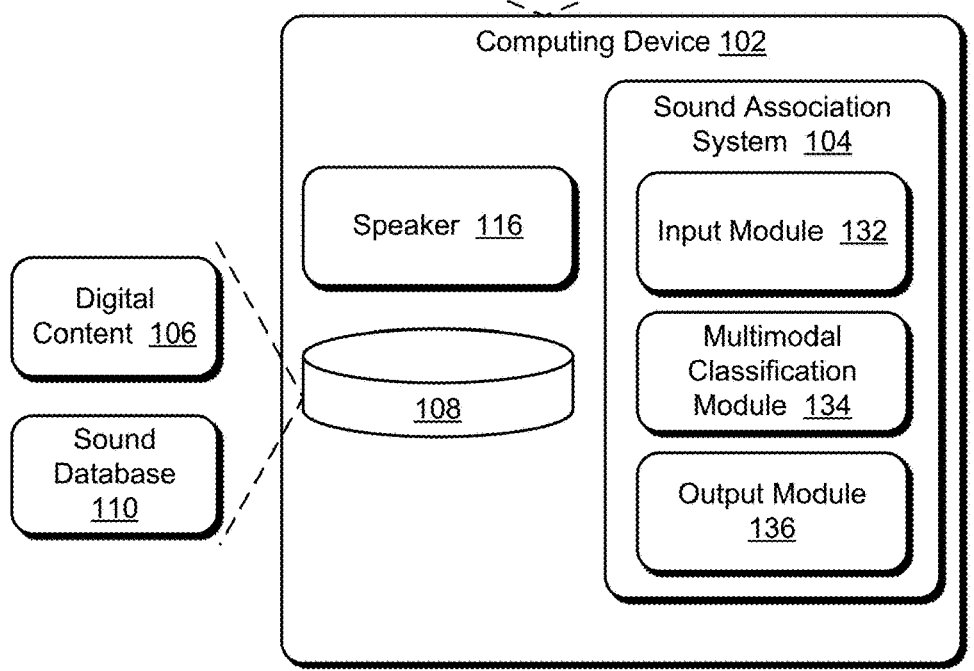
Fig. 1

900

902
Train a text classification module to identify a probability of a text input corresponding to each of multiple sound tags

904
Train a sound classification module to identify a probability of each of multiple context-based sounds corresponding to each of multiple sound tags

906
Provide a first embedding for the text input in an embedding space and a second embedding for a sound input in the embedding space to an additional classification module

908
Train the additional classification module to identify a probability of the text input corresponding to each of the multiple sound tags by minimizing a combination of a first loss to classify the text input and a second loss to quantify a difference between the first embedding and the second embedding

*Fig. 9*

AUTOMATICALLY ASSOCIATING CONTEXT-BASED SOUNDS WITH TEXT

BACKGROUND

As computing technology has advanced, various different uses for computers have been developed. One such use is the generation of digital content including text, such as digital books or magazines. Such digital content can be displayed to the user for his or her reading, and can optionally be audibly played back to the user (e.g., using a text to speech conversion system, or having an audiobook narrator record his or her reading of the text).

Some conventional systems also allow a soundtrack to be played as background music for digital books. Such a soundtrack is much like the soundtrack of a movie, typically being a musical accompaniment to the audio recording that continues throughout playback of the audio recording. While such soundtracks can add background music to digital books, they are not without their problems.

One such problem with such systems is that although these soundtracks can be used to arouse emotions or feelings in the user, they do not help immerse the user in the digital book. They do not provide the user with a feeling of being present in the audio playback (e.g., being present in the scenes that the digital book describes). This lack of immersion can be disappointing for users, leaving users frustrated with their computers and digital books.

Other conventional systems rely on manually recording sounds in a recording studio, also referred to as Foley-sounds, as is oftentimes done for movies. These recorded sounds can then be manually added to the audio recording. Such techniques, however, provide a significant barrier to entry for digital content creators due to the cost and technical expertise needed to generate such recorded sounds and manually add such sounds to the audio recording. These limitations can be disappointing for users because they typically result in no sounds being associated with the digital content, leaving users frustrated with their computers and digital books.

SUMMARY

To mitigate the drawbacks of conventional solutions for associating sounds with text, a sound association system as implemented by a computing device is described to automatically associate context-based sounds with text. An aurally active word in digital text and multiple context-based sounds corresponding to the aurally active word in the digital text are automatically identified. Multiple context-based sound identifiers are identified, each context-based sound identifier being associated with one of the multiple context-based sounds. The digital text and the multiple context-based sound identifiers are displayed. User selection of one of the multiple context-based sounds is received, and the digital text is presented (e.g., audibly output or displayed) concurrently with presenting (e.g., audibly outputting) the user selected context-based sound.

In accordance with one or more aspects of the techniques discussed herein, the sound association system includes a multimodal classification module. The multimodal classification module includes a text classification module, a sound classification module, and an additional classification module. The text classification module is trained to identify a probability of a text input corresponding to each of multiple sound tags by minimizing a first loss function between sound tags identified by the text classification module for training data texts and training labels for the training data texts, each sound tag corresponding to a context-based sound associated with an aurally active word or phrase. The sound classification module is trained to identify a probability of each of multiple context-based sounds corresponding to each of the multiple sound tags by minimizing the first loss function between sound tags identified by the sound classification module for training data sounds and training labels for the training data sounds. An output of the text classification module and an output of the sound classification module are provided to an additional classification module. This output of the text classification module is a first embedding for the text input in an embedding space rather than the probability of the text input corresponding to each of the multiple sound tags. This output of the sound classification module is a second embedding for a sound input in the embedding space rather than the probability of each of multiple context-based sounds corresponding to each of the multiple sound tags. The additional classification module is trained, with the first embedding and the second embedding being the inputs to the additional classification module, to identify a probability of the text input corresponding to each of the multiple sound tags by minimizing a combination of a first loss (e.g., a cross-entropy loss) to classify the text input correctly and a second loss (e.g., a divergence loss) to quantify a difference between the first embedding and the second embedding.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 1 is an illustration of a text classification digital medium environment in an example implementation that is operable to employ the automatically associating context-based sounds with text described herein.

FIG. 9 is a flow diagram depicting another procedure in an example implementation of automatically associating context-based sounds with text.

DETAILED DESCRIPTION

Overview

Figure 2:
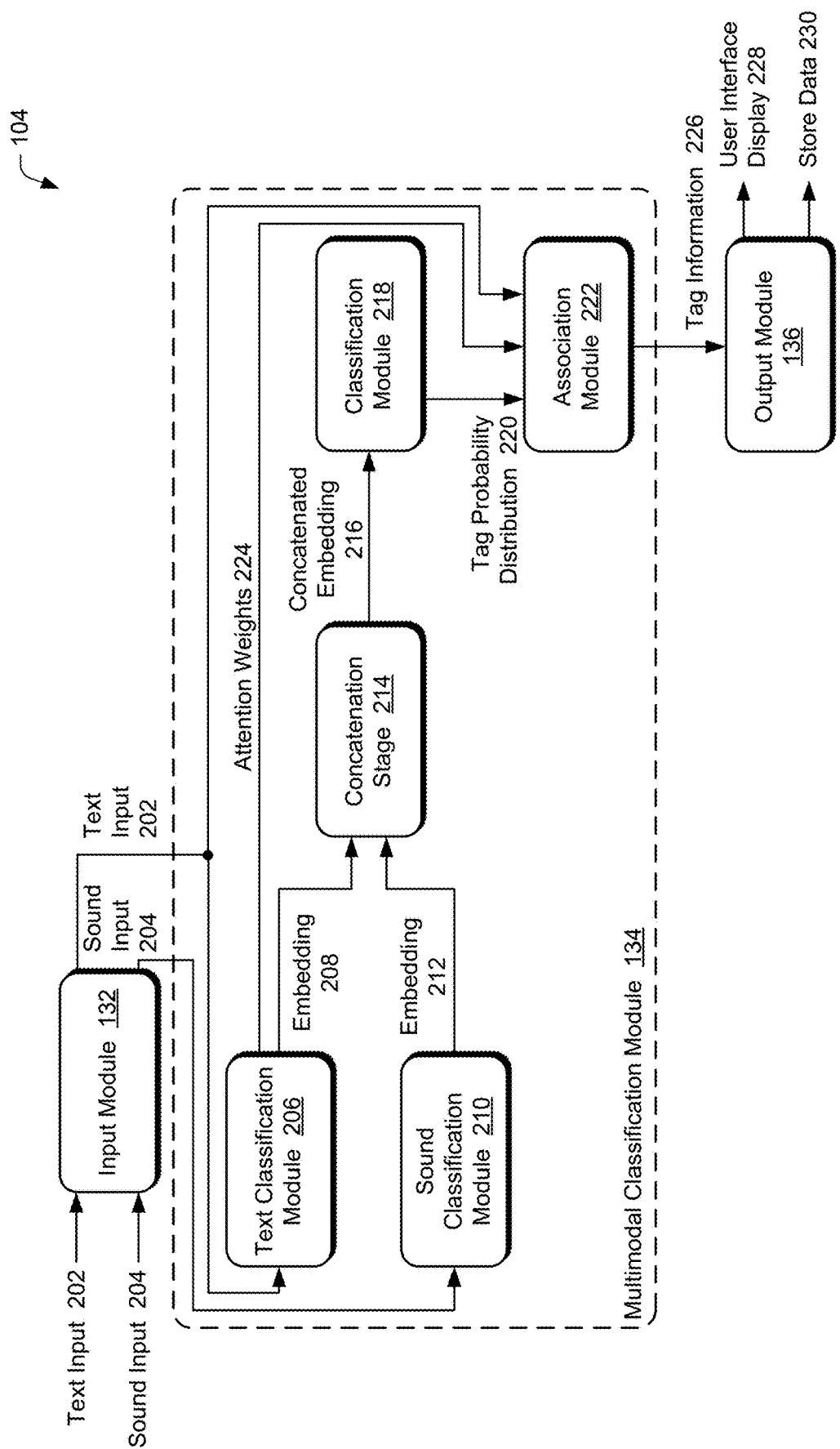
FIG. 2 is an illustration of an example architecture of a sound association system.

Current solutions for associating sounds with text involve generating a soundtrack to play as background music when an audio recording of the text is played back. This soundtrack is much like the soundtrack of a movie, typically being a musical accompaniment to the audio recording that continues throughout playback of the audio recording. Such soundtracks, however, are not anchored or associated with any particular words or phrases of the audio recording and do not provide specific sounds associated with particular words or phrases of the audio recording. For example, text being played back referring to a person walking towards a door may have a musical accompaniment intended to convey a feeling of suspense, but not the sounds of a person walking. These soundtracks thus lack an immersive-ness that give a listener a feeling of being present in the audio playback without engaging or interacting with the audio playback.

Other conventional solutions for associating sounds with text involve manually recording sounds in a recording studio, also referred to as Foley-sounds. These recorded sounds can then be manually added to the audio recording. Such techniques, however, are expensive and unavailable to many audio recording providers because significant technical expertise is typically needed to generate and record these sounds, as well as manually add these sounds to the audio recording.

These limitations of such solutions thus typically result in no sounds being associated with the digital content.

To overcome these problems, a sound association system identifies aurally active words or phrases in text. Aurally active words or phrases refer to words or phrases that denote particular sounds. For example, the word "knock" is an aurally active word that denotes a knocking or tapping sound. Context-based sounds corresponding to the aurally active words or phrases are also identified. Each context-based sound is anchored to or associated with the corresponding aurally active word or phrase and playback of the sound is controlled when that aurally active word or phrase is played back or read (e.g., the volume of the sound is increased), providing background sounds associated with the aurally active words or phrases.

More specifically, in one or more implementations a sound association system includes a multimodal classifier made up of a text classifier (e.g., a text classification module), a sound classifier (e.g., a sound classification module), and an additional classifier (e.g., an additional classification module). A text input is obtained, and the text classifier generates a first embedding that is a representation of the text input in an embedding space (e.g., the first embedding can be a 200-element vector). The sound classifier generates, for each of multiple possible sounds, a second embedding that is a representation of the sound in the same embedding space as the first embedding (e.g., the second embedding can be a 200-element vector). To train the multimodal classifier, the text classifier and the sound classifier are initially trained and then fine-tuned by concurrently training the text classifier, the sound classifier, and the additional classifier. After the multimodal classifier is trained, as discussed in more detail below, the second embedding is a set of constant values (e.g., all zeroes). The embedding space is an intermediary representation space for the text input and the sounds, allowing the multimodal classifier to identify sound tags associated with words of the text input at the embedding level rather than just the tag level.

The text classifier also generates attention weights, which are values that the text classifier learns to "attend" on while making predictions regarding classification. The attention weights indicate that a certain sound tag is predicted because of certain words in the text input and can be used to infer which words in the text input contributed more to the classification prediction than other words.

An additional classifier generates, based on the first embedding and the second embedding, sound tag probabilities of the text input being classified in one of the multiple classes (each class corresponding to a potential sound tag for the text input). These sound tag probabilities are output by the additional classifier as, for example, a tag probability distribution. This tag probability distribution indicates a likelihood, for each possible sound tag, that the sound tag corresponds to an appropriate context-based sound for the text input.

One or more sounds that are appropriate context-based sounds for the text input can be identified, for example, by using the tag probability distribution generated by the additional classifier to identify a first set of tags for the text input (e.g., a particular number of tags having the highest probabilities in the tag probability distribution of being appropriate context-based sounds for the text input). A second set of tags is identified for each of multiple sounds in a sound database (e.g., a particular number of tags having the highest probabilities of corresponding to the sound as indicated in the tag probability distribution generated by the sound classifier). A similarity score (e.g., the Jaccard similarity) between the first set of tags and each second set of tags is generated, and the sounds corresponding to the second sets of tags having a highest similarity score with the first set of tags are selected as the sounds that are appropriate context-based sounds for the text input.

A sound is also anchored to one or more aurally active words in the text input, localizing the sound to the most relevant context within the text input. Anchoring a sound to an aurally active word refers to associating the sound with the aurally active word to control the playback of the sound. For example, the sound can be played back at a higher volume when the aurally active word is being read or played back, and at a lower volume when the aurally active word is not being read or played back.

The attention weights from the text classifier are the attention weights for the words in the text input and are used to identify one or more words in the text input to which the one or more sounds are anchored. Words having higher attention weights are determined to be aurally active words that contribute more to causing the text classifier to identify sound tags associated with the text input than words having lower attention weights. For example, the attention weights indicate how much each of the words in the text input contribute to generation of a sound tag by the text classifier.

The sound association system displays a user interface including tags describing one or more sounds that are selected as appropriate context-based sounds for the text input (as determined by the multimodal classifier), identifiers of where the data for these context-based sounds is located (e.g., file names or other identifiers), an identifier of the one or more words in the text input to which the one or more sounds are anchored (e.g., the words having the highest attention weights), and the text input. This allows a user to select which of one or more sounds that are appropriate context-based sounds for the text input he or she would like to use as the context-based sound for the text input. Additionally or alternatively, the sound can be automatically selected by the multimodal classifier (e.g., the sound for which the tag probability distribution indicates the highest likelihood of being an appropriate context-based sound for the text input).

The sound association system also stores the sound (or an identifier of the sound) that is associated with the text input (e.g., automatically selected or selected by the user), an identifier of where the data for this context-based sound is located (e.g., file names or other identifiers), an identifier of the one or more words in the text input to which the one or more sounds are anchored, and the text input. This allows the context-based sounds associated with various text inputs to be subsequently retrieved and played back when the associated text input is displayed or otherwise presented.

The multimodal classifier can be trained as follows. In addition to the first embeddings, the text classifier also generates sound tag probabilities of the text input being classified in one of multiple classes, each class corresponding to a potential sound tag for the text input. These sound tag probabilities are output by the text classifier as, for example, a tag probability distribution. Similarly, in addition to the second embeddings, the sound classifier also generates sound tag probabilities of a sound being classified in one of the multiple classes (each class corresponding to a potential sound tag for the text input). These sound tag probabilities are output by the sound classifier as, for example, a tag probability distribution.

The text classifier is trained to identify one or more sound tags. The text classifier can be trained in various manners, such as by providing training data including a text input having one or more corresponding labels (sound tags). The text classifier identifies one or more sound tags for the text input, compares the identified one or more sound tags to the correct one or more the labels, and adjusts various weights in the text classifier to minimize a loss function. Various loss functions can be used, such as a sigmoid cross-entropy loss function.

For each of multiple sounds, the sound classifier obtains a feature vector describing the sound. Various different features can be used to generate the sound feature vector, such as Mel Frequency Cepstral Coefficients, Chroma Short-Time Fourier Transform, Mel spectrogram, spectral contrast, and Tonnetz features.

The sound classifier is trained to identify one or more sound tags. The sound classifier can be trained in various manners, such as by providing training data including a sound (e.g., in any of various formats, such as a WAV or MP3 format) having one or more corresponding labels (sound tags). The sound classifier identifies one or more sound tags for the sound, compares the identified one or more sound tags to the correct one or more the labels, and adjusts various weights in the sound classifier to minimize a loss function. Various loss functions can be used, such as a sigmoid cross-entropy loss function optimized using the Adam optimization algorithm.

The first embedding and the second embedding are concatenated and provided to the additional classifier. The additional classifier generates, based on the first embedding and the second embedding, sound tag probabilities of the text input being classified in one of the multiple classes (each class corresponding to a potential sound tag for the text input). These sound tag probabilities are output by the text classifier as, for example, a tag probability distribution.

The additional classifier is trained to identify one or more sound tags. The additional classifier can be trained in various manners, such as by using training data including text input, a sound input (e.g., in any of various formats, such as a WAV or MP3 format), and one or more corresponding labels (sound tags). A text input and a sound input having the same corresponding label are input to the text classifier and the sound classifier, respectively. The text classifier uses the training text input to generate a first embedding and the sound classifier uses the training sound input to generate a second embedding. These first and second embeddings are concatenated and provided to the additional classifier. This concatenated embedding is a training concatenated embedding because it was generated based on the training text input and the training sound input. The additional classifier identifies one or more sound tags for the concatenated embedding, compares the identified one or more sound tags to the correct one or more labels, and adjusts various weights in the additional classifier to minimize a loss function. Various loss functions can be used.

In one or more implementations, the loss function used to train the additional classifier is a weighted combination of the classification loss over the sound tags (e.g., as indicated by a sigmoid cross-entropy loss) and the divergence loss between the embeddings of text and sound (e.g., as indicated by a Kullback-Leibler divergence loss). Accordingly, once trained the additional classifier allows, for input text corresponding to a particular tag, a closest matching sound having the same tag associated with the sound to be identified.

In one or more implementations, the text classifier and the sound classifier are further trained concurrently with the additional classifier. The text classifier and the sound classifier were previously trained as discussed above, resulting in classifiers trained for unimodal classification (classification of text for the text classifier and classification of sound for the sound classifier). This further training allows the text classifier and the sound classifier to be fine-tuned to perform multimodal classification (based on both text and sound).

The text classifier is further trained by identifying one or more sound tags for the training data, comparing the identified one or more sound tags to the correct one or more labels, and adjusting various weights in the text classifier to minimize a loss function. When fine-tuning the text classifier, the loss function is the same weighted combination of the classification loss over the sound tags and the divergence loss between the embeddings of text and sound as used to train the additional classifier.

Similarly, the sound classifier is further trained by identifying one or more sound tags for the training data, comparing the identified one or more sound tags to the correct one or more labels, and adjusting various weights in the sound classifier to minimize a loss function. When fine-tuning the sound classifier, the loss function is the same weighted combination of the classification loss over the sound tags and the divergence loss between the embeddings of text and sound as used to train the additional classifier.

Using the multimodal classifier, trained based on minimizing a weighted combination of a classification loss over the sound tags and a divergence loss between the embeddings of text and sound as discussed above, allows sound tags to be associated with text input to be better identified. This multimodal classifier allows sound tags similar to one another to be identified for text input even though a unimodal classification would not allow such tags to be identified. For example, assume the sound tags include a tag of "knock". By using multimodal classification and training based on minimizing a divergence loss, additional sound tags that correspond to sounds that are similar to the sound of knocking can be identified, such as a sound tag of "tap". Accordingly, if a sentence were "Vishwa reached the door," because of the word "door" the multimodal classification module may identify a sound tag of "knock", and because of the training based on minimizing a divergence loss, the multimodal classification module may also identify the sound tag of "tap".

The techniques discussed herein provide for automatic association of context-based sounds with text inputs. Rather than just providing a background soundtrack, the context-based sounds provide an immersive-ness lacking in conventional solutions. These techniques allow the sound association system to generate context-based sounds that were previously unable to be automatically generated by a computing device. Additionally, rather than requiring recording of sounds in a recording studio for association with text inputs, the techniques discussed herein allow a large number of sounds (e.g., hundreds of thousands of sounds) to be available and automatically associated with text inputs.

Furthermore, rather than providing a unimodal classification system, the techniques discussed herein provide a multimodal classification system. As a result of using both text and sound classifiers, text input can be better identified, and sounds associated with particular aurally active words can be identified that would not be identified in a unimodal classification system.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a text classification digital medium environment 100 in an example implementation that is operable to employ the automatically associating context-based sounds with text described herein. The illustrated environment 100 includes a computing device 102, which may be configured in a variety of ways. The computing device 102, for instance, may be configured as a desktop computer, a server computer, a laptop computer, a mobile device (e.g., assuming a handheld configuration such as a tablet or mobile phone), a wearable device (e.g., augmented reality or virtual reality headsets), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 10.

The computing device 102 is illustrated as including a sound association system 104. The sound association system 104 is illustrated as being implemented as a standalone system. Additionally or alternatively, the sound association system 104 can be implemented as part of another system or program, such as a digital content editing program.

The sound association system 104 is implemented at least partially in hardware of the computing device 102 to process and transform digital content 106, which is illustrated as maintained in storage 108 of the computing device 102. Such processing includes, for example, one or more of creation of the digital content 106, modification of the digital content 106 to include sounds from a sound database 110, rendering of the digital content 106 in a user interface 112 for output, e.g., by a display device 114, audible playback of the digital content 106, e.g., by a speaker 116, and so forth. The digital content 106 refers to digital text as well as digital sounds that are or can be associated with different portions of the digital text. The storage 108 can be any of a variety of different types of storage, such as random access memory (RAM), Flash memory, solid state drive, magnetic disk drive, and so forth. Although illustrated as implemented locally at the computing device 102, functionality of the sound association system 104 may also be implemented in whole or part via functionality available via the network 118, such as part of a web service or "in the cloud."

The sound association system 104 automatically associates different sounds from the sound database 110 with digital text in digital content 106. In one or more implementations, the sound database 110 includes a large number of sounds (e.g., over 5,000 and potentially hundreds of thousands of sounds). This association of sounds to digital text can be made without user input, or alternatively multiple options can be displayed to a user of the sound association system 104 for final selection of one or more of the multiple options to associate with particular digital text. For example, the sound association system 104 receives as an input digital text 120, which is displayed in the user interface 112. The sound association system 104 identifies the two sentences in the digital text 120 and displays them separately as digital text 122 and digital text 124. The sound association system 104 automatically identifies sound tags (also referred to herein as simply tags) associated with digital text 122 and 124, illustrated as tags 126 and 128, respectively. The aurally active words in the digital text 122 and 124 that resulted in the shown tags are highlighted, providing an indication to the user of why those tags were chosen. For example, for the digital text "He knocked to see if anyone was inside", the aurally active words that resulted in identifying the tags "wood," "knock," and "door" are the words "knocked," "anyone," and "inside". Drop-down menus adjacent to the tags allow the user to select one or more of the tags to associate with each digital text 122 and 124.

An example of functionality incorporated by the sound association system 104 to process the digital content 106 is illustrated as an input module 132, a multimodal classification module 134, and an output module 136. The input module 132 implements functionality to receive or otherwise obtain digital content 106 and sounds from sound database 110 as inputs to the sound association system 104. The multimodal classification module 134 implements functionality to associate different sounds from the sound database 110 with digital text in digital content 106. The output module 136 implements functionality to output the digital content with associated sounds, such as by storing the digital content, displaying and playing back the digital content, and so forth.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Sound Association System Architecture

FIG. 2 is an illustration of an example architecture of a sound association system 104. The sound association system 104 includes the input module 132, the multimodal classification module 134, and the output module 136. The input module 132 obtains text input 202 and sound input 204. The text input 202 can be obtained in various manners, such as from a stored file (e.g., stored on the storage device 108), from user input at the computing device 102 (e.g., the user typing in or dictating the digital text), and so forth. The sound input 204 is digital sounds obtained from the sound database 110.

The input module 132 provides the text input 202 to a text classification module 206, which generates an embedding 208. This embedding 208 is a representation of the text input 202 in an embedding space (e.g., in one or more implementations the embedding 208 is a 200-element vector). Similarly, the input module 132 provides the sound input 204 to a sound classification module 210, which generates an embedding 212 in the same embedding space as the embedding 208. This embedding 212 is a representation of the sound input 204 in the embedding space (e.g., in one or more implementations the embedding 212 is a 200-element vector).

This embedding space is an intermediary representation space for the text input 202 and the sound input 204, allowing the multimodal classification module 134 to be trained based on both the text input 202 and the sound input 204. This multimodal training allows the multimodal classification module 134 to identify tags associated with words of the text input 202 at the embedding level rather than just the tag level. The training of the multimodal classification module 134 is discussed in additional detail below.

In one or more implementations, the text classification module 206 is implemented as a machine learning system. A machine learning system refers to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

For example, the text classification module 206 can be implemented as an Attention-based Bidirectional Long Short-Term Memory Network (also referred to as an Attention-BLSTM or Bi-LSTM with Attention). In one or more implementations, the text classification module 206 is a Bi-LSTM with Attention classifier except providing an output that is an embedding from the penultimate layer of the Bi-LSTM with Attention as discussed in more detail below.

Figure 3:
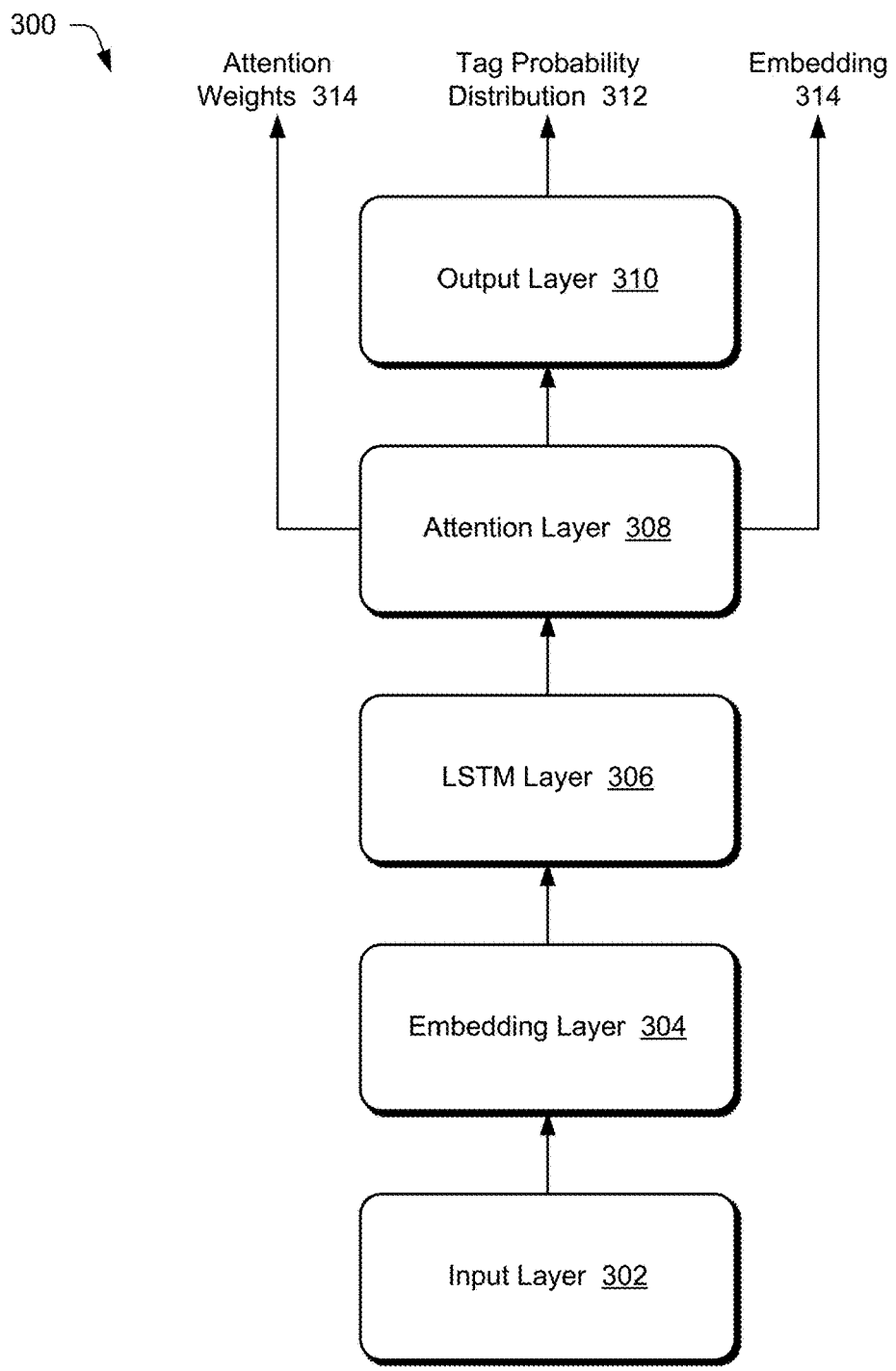
FIG. 3 illustrates an example text classification module implemented as a Bi-LSTM with Attention.

FIG. 3 illustrates an example text classification module 300 implemented as a Bi-LSTM with Attention. The text classification module 300 is an example of the text classification module 206 of FIG. 2. The text classification module 300 includes an input layer 302, an embedding layer 304, an LSTM layer 306, an attention layer 308, and an output layer 310.

The input layer 302 receives a sentence, which is optionally extracted from a series of sentences (e.g., a paragraph). In one or more implementations, the input sentence has a target length (e.g., 32 words). If the input sentence is longer than the target length then the input sentence is truncated to be the target length (e.g., by deleting words from the end of the sentence, by deleting particular parts of speech from the sentence such as conjunctions, prepositions, or pronouns). If the input sentence is shorter than the target length then the input sentence is padded to be the target length (e.g., by adding words to the sentence that are not expected to have a decisive effect on classification, such as adding conjunctions, prepositions, or pronouns to the sentence).

Although discussed herein as operating on sentences, additionally or alternatively the text classification module 300 can operate on other units of speech or word groupings. For example, the text classification module 300 can operate on (and the input layer 302 can receive as input) multiple sentences. By way of another example, the text classification module 300 can operate on (and the input layer 302 can receive as input) a portion of a sentence such as a clause.

The embedding layer 304 maps each word of the received sentence into a low dimension vector. Any of a variety of different embedding techniques can be used in the embedding layer 304, such as the GloVe (Global Vectors for Word Representation) technique. In one or more implementations, the embedding layer 304 generates a 200-dimension embedding (vector) for the input sentence.

The LSTM layer 306 utilizes a BLSTM to generate high level features from the low dimension vector generated by the embedding layer 304. The attention layer 308 produces a weight vector and merges word-level features from each time step into a sentence-level feature vector by multiplying the weight vector. The attention layer automatically focuses on the words in the sentence that have decisive effect on classification, allowing the most important semantic information in a sentence to be identified. The output layer 310 uses the sentence-level feature vector generated by the attention layer 308 for generating a tag for the sentence.

In one or more implementations, the LSTM layer 306 is a 32-unit Bi-LSTM network, which outputs two 32×200-dimensional hidden vectors for each of the forward and backward pass. The corresponding vectors from the forward and backward passes over the input sentence are concatenated. Since each word contributes differently to the prediction, word level attention is leveraged on this hidden vector. An attention vector r is computed using the following formulae:

$$H = \overline{H_1} + \overline{H_2}$$
$$M = \tanh(H)$$
$$\alpha = \mathrm{softmax}(w^T M)$$
$$r = H \alpha^T$$

where $\overline{H_1}$ and $\overline{H_2}$ refer to the forward and backward pass hidden vectors, w refers to a trained parameter vector (e.g., weights generated during training), $w^T$ refers to a transpose of the vector w, and a refers to the attention weights for the words in the sentence. The attention vector r is provided to the output layer 310 which uses a sigmoid function to obtain sound tag probabilities over multiple (e.g., 570) classes. Each class corresponds to a potential sound tag for the sentence. The output layer 310 outputs these sound tag probabilities as tag probability distribution 312.

The attention weights a are values that the text classification module 300 learns to "attend" on while making predictions regarding classification. These attention weights can be used to infer which words in the sentence contributed more to the classification than other words.

Thus, using the Bi-LSTM with Attention classifier, sound tags are predicted at a sentence level. However, attention weights indicating that a certain sound tag is predicted because of certain words in the sentence are available due to the attention layer 308. These attention weights are the values in the attention vector r and include an attention weight for each word in the sentence. Although tags are discussed herein as being predicted at the sentence level, additionally or alternatively tags can be predicted at other levels (e.g., multiple-sentence levels, partial-sentence levels, etc.).

Additional information on the Bi-LSTM with Attention classifier can be found in Attention-Based Bidirectional Long Short-Term Memory Networks for Relation Classification, by Peng Zhou, Wei Shi, Jun Tian, Zhenyu Qi, Bingchen Li, Hongwei Hao, Bo Xu, Proceedings of the 54th Annual Meeting of the Association for Computational Linguistics, pages 207-212, Berlin, Germany, Aug. 7-12, 2016, which is hereby incorporated by reference in its entirety.

The text classification module 300 is trained to identify one or more sound tags. The text classification module 300 can be trained in various different manners. In one or more implementations, the text classification module 300 is trained by providing training data including digital text having one or more corresponding labels (sound tags). The text classification module 300 identifies one or more sound tags for the digital text, compares the identified one or more sound tags to the correct one or more sound tags (the labels), and adjusts various weights in the text classification module 300 to minimize a loss function between the identified one or more sound tags and the correct one or more sound tags. This process is repeated for multiple training texts and labels. Various loss functions can be used, such as a sigmoid cross-entropy loss function.

The attention layer 308 also outputs an embedding 314, which is an embedding 208 of FIG. 2 (the attention vector r output by the attention layer 308). The embedding 314 is used by the concatenation stage 214 as discussed in more detail below. The attention layer 308 also outputs attention weights 316 (e.g., the values a discussed above), which can be used to identify one or more words in the text input 202 to which the one or more sounds are anchored as discussed in more detail below.

Returning to FIG. 2, although an example of the text classification module 206 is discussed herein as a Bi-LSTM with Attention classifier, other types of classifiers can be used. For example, the text classification module 206 can be implemented as a Bidirectional Encoder Representations from Transformers (BERT) classifier trained using a binary cross-entropy loss function.

By way of another example, the text classification module 206 can be implemented using a Word2vec-based cosine similarity classifier. In a Word2vec-based cosine similarity classifier, sentence embeddings for each input sentence are computed as the average of a word2vec embedding (e.g., 300-dimensional embedding) of each word in the sentence. To find the most relevant tag for the sentence, the cosine similarity of the sentence embedding with the word-embedding of each possible sound tag is calculated. The most similar tag is considered to be the appropriate tag for the sentence. A threshold of similarity (e.g., 0.3) is optionally set to avoid random tags for sentences that naturally should have no sounds associated with them.

The sound classification module 210 obtains a feature vector describing a sound input 204. The sound classification module 210 can receive this sound feature vector from another module (e.g., a pre-processing module) or can generate this sound feature vector itself.

In one or more implementations, the sound feature vector for a sound is generated by pre-processing the audio of the sound (e.g., at a sampling rate of 22.05 kHz). A window size (e.g., 6 seconds) and a hop amount (e.g., 3 seconds) between windows is used (accordingly, adjacent windows overlap by some amount, 3 second in this example). A feature vector for each window is calculated for each window based on various different features of the sound. A max pooling is then performed over all of the feature vectors from each of the windows for the sound, resulting in a sound feature vector for the sound.

Various different features can be used to generate the sound feature vector. In one or more implementations, the features include Mel Frequency Cepstral Coefficients (MFCCs), Chroma Short-Time Fourier Transform (STFT), Mel spectrogram, spectral contrast, and Tonnetz features. The MFCCs features for a window are an indication of which frequencies are present in the window. The MFCCs can include, for example, 40 features. The Chroma STFT features for a window are an indication of the pitch present in the window. The Chroma STFT features can include, for example, 12 features after taking the mean over the time axis. The Mel spectrogram features for a window are another indication of the pitch present in the window. The Mel spectrogram features can include, for example, 128 features (one for each bin in the spectrogram). The spectral contrast features for a window are an indication of the relative distribution of the harmonic and non-harmonic components in the spectrum in the window. The spectral contrast features can include, for example, 7 values. The Tonnetz features for a window are an indication of the melody in the window. The Tonnetz features can include, for example, 6 values. Accordingly, the sound feature vector can be a 193-feature input vector.

In one or more implementations, the sound classification module 210 is implemented as a machine learning system. For example, the sound classification module 210 can be implemented as a deep neural network. In one or more implementations, the sound classification module 210 is a deep neural network providing an output that is an embedding from the penultimate layer of the deep neural network as discussed in more detail below.

Figure 4:
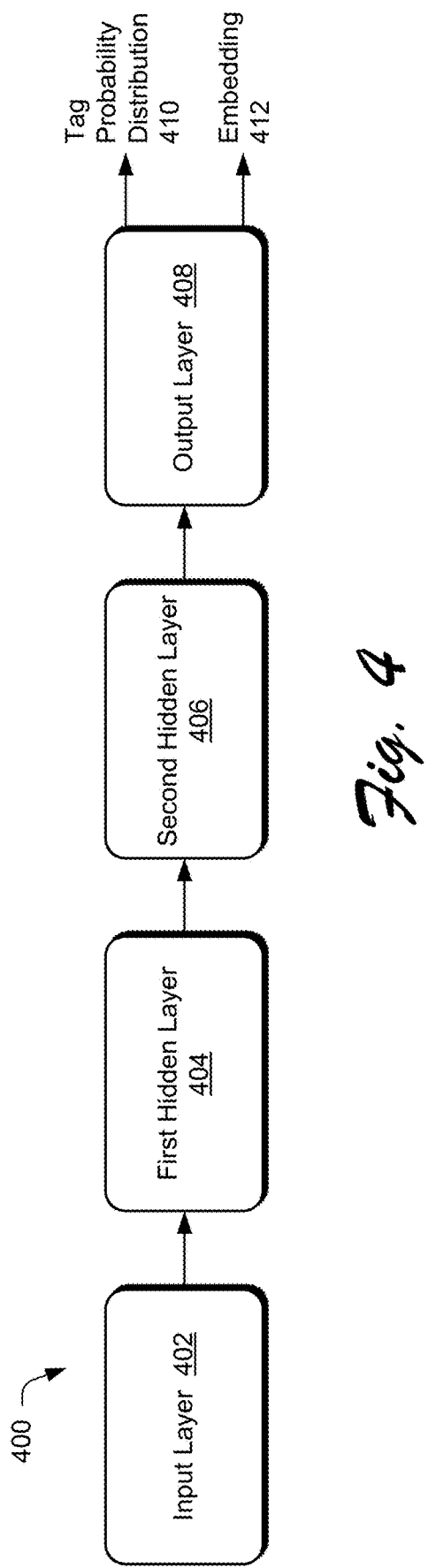
FIG. 4 illustrates an example sound classification module implemented as a deep neural network.

FIG. 4 illustrates an example sound classification module 400 implemented as a deep neural network. The sound classification module 400 is an example of the sound classification module 210 of FIG. 2. The sound classification module 400 includes an input layer 402, a first hidden layer 404, a second hidden layer 406, and an output layer 408. The input layer 402 receives a sound feature vector for the sound input 204.

The first hidden layer 404 is a fully connected layer including 500 units that receives the feature vector from the input layer 402. In one or more implementations, for the first hidden layer 404, tan h activation is used and a dropout of 0.2 is added with a keep probability of 0.8 and L2 regularization with beta of $10^{-7}$.

The second hidden layer 406 is a fully connected layer including 200 units that receives the output from the first hidden layer 404. In one or more implementations, for the second hidden layer 406, tan h activation is used and a dropout of 0.2 is added with a keep probability of 0.8 and L2 regularization with beta of $10^{-7}$. The 200-element vector generated by the second hidden layer 406 is provided to the output layer 408 which uses a sigmoid function to obtain sound tag probabilities over multiple (e.g., 570) classes. Each class corresponds to a potential sound tag for the sound. The output layer 408 outputs these sound tag probabilities as tag probability distribution 410. These sound tag probabilities are the probabilities of each class corresponding to the sound.

The sound classification module 400 is trained to identify one or more sound tags. The sound classification module 400 can be trained in various different manners. In one or more implementations, the sound classification module 400 is trained by providing training data including sounds (e.g., in any of various formats, such as a WAV or MP3 format) having one or more corresponding labels (sound tags). The training data is optionally standard scaled, for example using the statistics standardization equation $Z=(x-u)\div s$, where x refers to the value being standardized, u refers to the mean of the training data, and s refers to the standard deviation of the training data. The sound classification module 400 identifies one or more sound tags for the sound, compares the identified one or more sound tags to the correct one or more sound tags (the labels), and adjusts various weights in the sound classification module 400 to minimize a loss function between the identified one or more sound tags and the correct one or more sound tags. This process is repeated for multiple training sounds and labels. Various loss functions can be used, such as a sigmoid cross-entropy loss function optimized using the Adam optimization algorithm.

The output layer 408 also outputs an embedding 412, which is an embedding 212 of FIG. 2 (which is the 200-element vector generated by the second hidden layer 406). The embedding 412 is used by the concatenation stage 214 as discussed in more detail below.

Returning to FIG. 2, although an example of the sound classification module 208 is discussed herein as a deep neural network with reference to FIG. 4, other types of classifiers can be used. For example, the sound classification module 210 can be implemented as a convolutional neural network (CNN). For such a CNN, spectrogram images of the sounds are calculated using an STFT function, squaring the result and then taking the dot product of the result with a mel basis. A threshold length is optionally imposed on the sounds. Sounds longer than a threshold duration (e.g., 10 seconds) are clipped to 10 seconds (e.g., keeping the first 10 seconds and deleting the remaining portion of the sound). Sounds shorter than the threshold duration are repeated until a sound clip of the threshold duration is obtained.

In one or more implementations, such a CNN includes three convolutional layers, the first two of which are individually followed by a pooling layer. The third convolutional layer is followed by a fully connected layer and an output layer that uses a sigmoid function to obtain probability over multiple (e.g., 570) classes. Each class corresponds to a tag for the sound. Such a CNN can be trained using training data that are standard scaled images of spectrograms having one or more corresponding labels (sound tags) and adjusting various weights in the CNN to minimize a loss function (e.g., a sigmoid cross-entropy loss function).

The embeddings 208 generated by the text classification module 206 are provided to the concatenation stage 214. These embeddings 208 are, for example, the embeddings output by the attention layer 308 of the text classification module 300. Similarly, the embeddings 212 generated by the sound classification module 210 are provided to the concatenation stage 214. These embeddings 212 are, for example, the embeddings output by the second hidden layer 406 of the sound classification module 400.

The concatenation stage 214 concatenates a received embedding 208 and a received embedding 212, generating the concatenated embedding 216 that is provided to the classification module 218. In one or more implementations, the classification module 218 is implemented as a machine learning system. For example, the classification module 218 can be implemented as a deep neural network. In one or more implementations, the classification module 218 is a deep neural network providing an output that is a tag probability distribution 220 indicating a probability of each of the sounds in the sound database 110 being an appropriate context-based sound for the text input 202.

Figure 5:
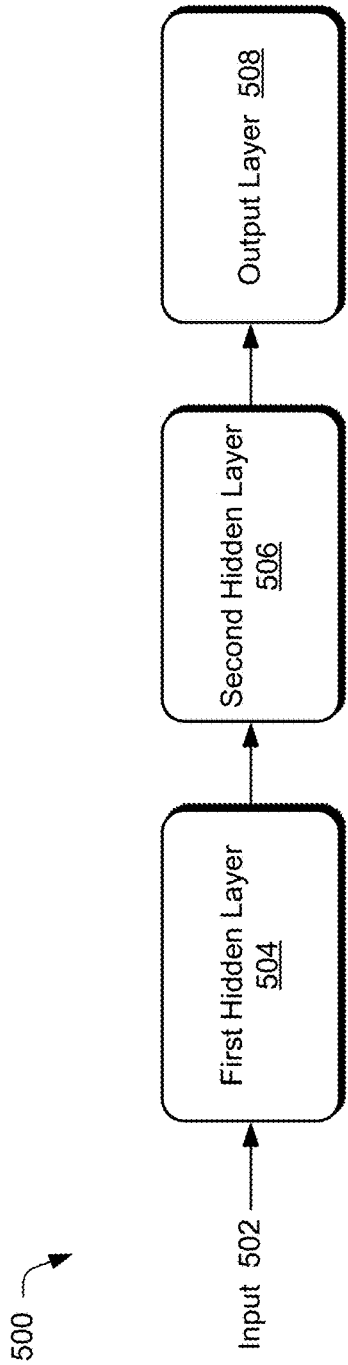
FIG. 5 illustrates an example classification module implemented as a deep neural network.

FIG. 5 illustrates an example classification module 500 implemented as a deep neural network. The classification module 500 is an example of the classification module 218 of FIG. 2. The classification module 500 includes an input 502, a first hidden layer 504, a second hidden layer 506, and an output layer 508. The input 502 is the concatenated embedding 216 of FIG. 2 generated by the concatenation stage 214. Accordingly, the concatenation stage 214 can also be viewed as an input layer of the classification module 218.

The first hidden layer 504 is a fully connected layer including 500 units that receives the input 502. In one or more implementations, for the first hidden layer 504, tan h activation is used and a dropout of 0.2 is added with a keep probability of 0.8 and L2 regularization with beta of $10^{-7}$.

The second hidden layer 506 is a fully connected layer including 300 units that receives the output from the first hidden layer 504. In one or more implementations, for the second hidden layer 506, tan h activation is used and a dropout of 0.2 is added with a keep probability of 0.8 and L2 regularization with beta of $10^{-7}$. The 300-element vector generated by the second hidden layer 506 is provided to the output layer 508 which uses a sigmoid function to obtain a probability of the input 502 being one of multiple (e.g., 570) classes. Each class corresponds to a tag for the sound.

The classification module 500 is trained to identify one or more sound tags. The classification module 500 can be trained in various different manners. In one or more implementations, the classification module 500 is trained using training data including a training text, a training sound (e.g., in any of various formats, such as a WAV or MP3 format), and one or more corresponding labels (sound tags). A training text and a training sound having the same corresponding label are input to the text classification module 206 and the sound classification module 208 of FIG. 2, respectively. The text classification module 206 uses the training digital text to generate an embedding 208 and the sound classification module 210 uses the training sound to generate an embedding 212. These embeddings 208 and 212 are provided to the concatenation stage 214, which generates and provides concatenated embedding 216 to the classification module 218. This concatenated embedding 216 is a training concatenated embedding because it was generated based on the training digital text and the training sound data. The classification module 500 identifies one or more sound tags for the concatenated embedding 216, compares the identified one or more sound tags to the correct one or more sound tags (the training labels), and as part of the training various weights in the text classification module 500 are adjusted to minimize a loss function. This process is repeated for multiple training texts, training sounds, and labels. Various loss functions can be used.

In one or more implementations, the loss function used to train the classification module 218 is a weighted combination of the classification loss over the sound tags and the divergence loss between the embeddings of text and sound. This weighted loss function is:

$$\text{Weighted Loss} = SCE + \frac{1}{1+\lambda} * KL$$

where SCE refers to the sigmoid cross-entropy loss, KL refers to the symmetric Kullback-Leibler divergence loss (or the Jensen-Shannon divergence loss), and λ refers to the weighting factor. The larger the value of A, the less the KL term factors into the Loss value. The SCE term operates to have the input text classified correctly. The KL term operates to quantify the difference between two vectors (the embeddings 208 and 212) and have the embeddings 208 and 212 be close to each other. Accordingly, once trained the classification module 500 allows, for input text corresponding to a particular tag, a closest matching sound having the same tag associated with the sound to be identified.

In one or more implementations, the text classification module 206 and the sound classification module 210 are further trained along with (concurrently with) the classification module 218. The text classification module 206 and the sound classification module 210 were previously trained as discussed above, resulting in classification modules trained for unimodal classification (classification of text for the text classification module 206, and classification of sound for the sound classification module 210). This further training allows the text classification module 206 and the sound classification module 210 to be fine-tuned to perform multimodal classification (based on both texts and sounds).

The text classification module 206 is further trained in a manner analogous to the discussion above regarding training of the text classification module 206, except that the loss function that is minimized is a weighted combination of the classification loss over the sound tags and the divergence loss between the embeddings of text and sound (the weighted loss function Weighted Loss discussed above). Similarly, the sound classification module 210 is further trained in a manner analogous to the discussion above regarding training of the sound classification module 210, except that the loss function that is minimized is a weighted combination of the classification loss over the sound tags and the divergence loss between the embeddings of text and sound (the weighted loss function Weighted Loss discussed above).

Thus, training of the multimodal classification module 134 includes training the text classification module 206 and the sound classification module 210 as discussed above. Then, the classification module 218 is trained and the text classification module 206 and sound classification module 210 are further trained (fine-tuned) as discussed above.

Using the multimodal classification module 134, trained based on minimizing a weighted combination of a classification loss over the sound tags and a divergence loss between the embeddings of text and sound as discussed above, allows sound tags to be associated with text input to be better identified. This multimodal classification allows sound tags similar to one another to be identified for text input even though a unimodal classification (e.g., based on the text classification module 206 and the sound classification module 210 not being fine-tuned as discussed above) would not allow such tags to be identified. For example, assume the sound tags include a tag of "knock". By using multimodal classification and training based on minimizing a divergence loss, additional sound tags that correspond to sounds that are similar to the sound of knocking can be identified, such as a sound tag of "tap". Accordingly, if a sentence were "Vishwa reached the door," because of the word "door" the multimodal classification module may identify a sound tag of "knock", and because of the training based on minimizing a divergence loss, the multimodal classification module may also identify the sound tag of "tap".

After being trained, the multimodal classification module 134 generates a tag probability distribution 218 for text input 202, which in one or more implementations is a sentence. More specifically, the text classification module 206 generates an embedding 208 and the sound classification module 210 provides an embedding 212 of constant values (e.g., all zeroes). The concatenation stage 214 generates the concatenated embedding 216 and inputs the concatenated embedding 216 into the classification module 218. In one or more implementations, since the sound classification module 210 provides an embedding 212 of constant values after being trained, after the multimodal classification module 134 is trained the sound classification module 210 can optionally be removed and the concatenation stage 214 can be configured to use the constant values as the embedding 212.

The classification module 218 generates the tag probability distribution 220 based on the concatenated embedding 216 and provides the tag probability distribution 220 to an association module 222. This tag probability distribution 220 indicates a likelihood, for each possible sound tag, that the sound tag corresponds to an appropriate context-based sound for the text input 202.

The association module 222 receives the tag probability distribution 220 from the classification module 218. The association module 222 can use the tag probability distribution 220 to identify one or more sounds that are appropriate context-based sounds for the text input 202. The association module 222 can identify these one or more sounds in various manners as discussed in more detail below.

The association module 222 also receives attention weights 224 from the text classification module 206. The attention weights 224 are the attention weights for the words in the text input 202 (e.g., the values a discussed above) and the association module 222 can use the attention weights 224 to identify one or more words in the text input 202 to which the one or more sounds are anchored. The association module 222 infers that words having higher attention weights are aurally active words that contribute more to causing the text classification module 206 to identify sound tags associated with the text input 202 than words having lower attention weights. For example, the attention weights indicate how much each of the words in the text input 202 contribute to generation of a sound tag by the text classification module 206 (or the sound tag that would be generated if the text classification module 206 includes the output layer 310). Accordingly, the one or more aurally active words to which the one or more sounds are anchored are the one or more words in the text input 202 having the highest attention weights.

The association module 222 generates and provides tag information 226 to the output module 136. The output module 136 displays a user interface display 228 based on the tag information 226. In one or more implementations, the tag information 226 includes tags describing one or more sounds that are appropriate context-based sounds for the text input 202, identifiers of where the data for these context-based sounds is located (e.g., file names or other identifiers), an identifier of the one or more words in the text input 202 to which the one or more sounds are anchored, and the text input 202.

The association module 222 can identify one or more sounds that are appropriate context-based sounds for the text input 202 in a variety of different manners. In one or more implementations, the association module 222 uses the tag probability distribution 220 to identify a first set of tags for the text input 202. The first set of tags includes a particular number (e.g., 3) of tags for the text input 202. The association module 222 identifies as the first set of tags the particular number of tags having the highest probabilities in the tag probability distribution 220 of being appropriate context-based sounds for the text input 202. The association module 222 uses the tag probability distribution 410 from the sound classification module 210 to identify a second set of tags for each sound in the sound database 110. Each second set of tags includes a particular number (e.g., 3) of tags for a sound in the sound database 110. The association module 222 identifies as the second set of tags for each sound the particular number of tags having the highest probabilities of corresponding to the sound in the tag probability distribution 410. These second set of tags can be calculated once and stored so that they do not need to be re-calculated for each different text input 202. The particular number of tags identified for the text input 202 and for the sounds in the sound database 110 can be a user configuration setting.

The association module 222 generates a similarity score (e.g., the Jaccard similarity) between the first set of tags and each second set of tags. The association module selects, as a particular number (e.g., 3) of sounds associated with the first set of tags, the sounds corresponding to the second sets of tags having a highest similarity score with the first set of tags. Identifiers of where the data for these sounds is located (e.g., file names or other identifiers) as well as the first set of tags are provided to the output module 136 as tag information 226.

Additionally or alternatively, the association module 222 can identify one or more sounds that are appropriate context-based sounds for the text input 202 in other manners. For example, the text input 202 is provided to the text classification module 206 and the embedding 208 is provided to the association module 222. The embeddings 212 for each sound in the sound database 110 are also generated (or have been previously calculated and stored). The association module 222 computes, for each sound in the sound database 110, a divergence score indicating the divergence of the embedding 212 generated for the sound and the embedding 208 for the text input 202. A particular number of embeddings 212 (e.g., 3), which can be a user configuration setting, having the smallest divergence score with the embedding 208 for the text input 202 are selected, and the sounds corresponding to the selected embeddings 212 are identified as the appropriate context-based sounds for the text input 202.

The association module 222 also anchors a sound to one or more aurally active words in the text input 202, localizing the sound to the most relevant context within the text. Anchoring a sound to an aurally active word refers to associating the sound with the aurally active word to control the playback (audible output) of the sound (e.g., a volume of the sound or when the sound is audibly output as discussed in more detail below). In one or more implementations, a user interface is provided allowing a user to select which of multiple (e.g., 3) context-based sounds that were identified for the text input 202 is the context-based sound that is anchored to one or more aurally active words in the text input 202. Additionally or alternatively, the association module 222 can automatically select a context-based sound to anchor to one or more aurally active words in the text input 202, such as the word having the highest attention weight 224 for the text input 202.

Anchoring a sound to one or more aurally active words in the text input 202 allows the context-based sound to be played back at the appropriate time or the volume of the sound to change. In one or more implementations, when the text input 202 is presented to a listener (e.g., displayed on a display device, audibly output via a speaker), the context-based sound is audibly output while the text input is being presented (e.g., for the duration of the text input presentation). However, the volume of the context-based sound increases as the aurally active word to which the context-based sound is anchored is read. This volume change can be included in the sound as saved corresponding to the text input. Additionally or alternatively, this volume change can be implemented by a playback system on a computing device (e.g., that retrieves the text for presentation as well as the context-based sound anchored to one or more words in the text, and increases/decreases as appropriate the volume of the context-based sound as the text is presented).

For example, if the sentence is "As he knocked he heard screams of some child," then a sound of screaming can be audibly output during reading of the sentence, but the volume of the sound of screaming can be increased as the word "screams" is read.

The amount of the volume increase can be determined in a variety of different manners, such as based on the attention weight 224 for the aurally active word to which the context-based sound is anchored. The volume of a context-based sound for an aurally active word with a higher attention weight is increased greater than the volume of a context-based sound for an aurally active word with a lower attention weight.

In one or more implementations, the association module 222 modulates the volume of the sound based on the attention weights. The association module 222 performs min-max scaling for the attention weights for the words in the sentence, takes the log of each scaled attention weight, squares the logs of the weights, and subtracts the result from the volume of the audio. The association module 222 then decreases the volume of the sound for words in the sentence that are not aurally active words, effectively increasing the volume of the sound for the aurally active words in the sentence.

Additionally or alternatively, rather than audibly outputting the sound at a lower volume for the one or more words that the sound is not anchored to and at a higher volume for the one or more words that the sound is anchored to, the sound can be audibly output when the one or more words that the sound is anchored to is read. Accordingly, the sound is not audibly output when words that the sound is not anchored to are read.

Which words of the text input 202 are being read at any given time can be determined in a variety of different manners. In some situations, the text input is audibly output (e.g., using a text to speech conversion system, or having a narrator record his or her reading of the text). In such situations, when the one or more words that the sound is anchored to are being read is readily determined by analyzing the recorded reading of the text or as the words are converted to speech.

Additionally or alternatively, the text input is read audibly by the user. In such situations, when the one or more words that the sound is anchored to are being read is readily determined by analyzing the audible reading of the text. Additionally or alternatively, the text input is read back silently by the user. In such situations, when the one or more words that the sound is anchored to are being read can be determined in various manners. For example, a camera can track eye movement of the user to readily determine which word is being read at any given time. By way of another example, a typical rate (e.g., for all users, for a class that the user belongs to (e.g., adults), a learned rate for the user) can be determined. Given the time at which the text input is initially displayed to the user, this typical rate, and the position of the words being displayed relative to the first word displayed, which word is being read at any given time can be readily determined.

Figure 6:
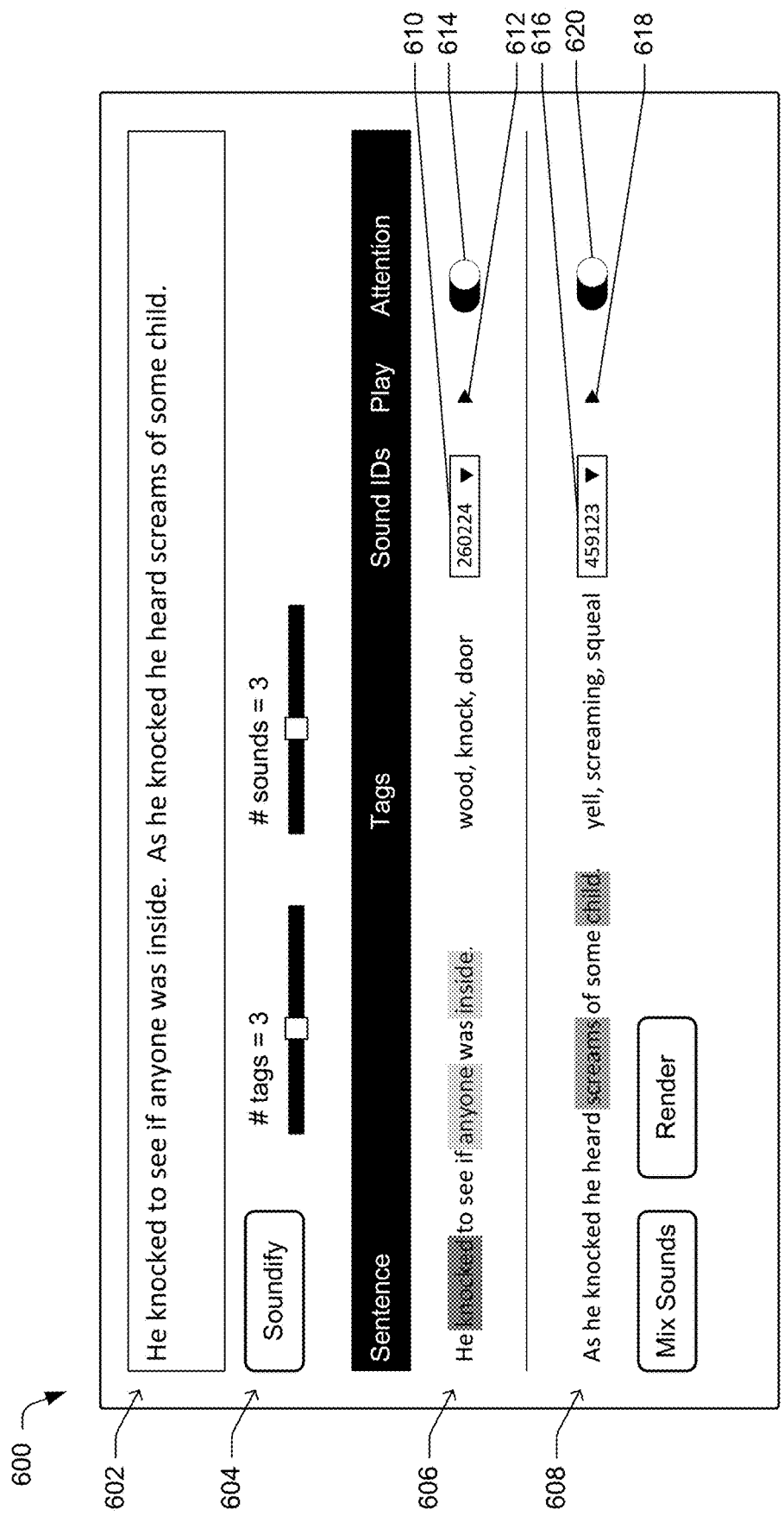
FIG. 6 illustrates an example user interface displayed by an output module.

FIG. 6 illustrates an example user interface 600 displayed by the output module 136. The user interface 600 includes a text input portion 602, an activation portion 604, and tag portions 606 and 608. The text input portion 602 displays a text input which is, for example, text that the user is inputting. The activation portion 604 includes a button to cause the sound association system 104 to automatically associate context-based sounds with the text input displayed in portion 602 as well as configuration settings for the sound association system 104. The configuration settings include a number of tags the sound association system 104 generates for each sentence in portion 602 and a number of context-based sounds to identify for each sentence in portion 602. Slider user interface elements allow the user to increase or decrease the number of tags generated for each sentence as well as increase or decrease the number of context-based sounds identified for each sentence.

The sound association system 104 generates, for each sentence in the portion 602, one or more tags and one or more corresponding sounds. These are displayed in separate tag portions 606 and 608 each corresponding to one of the two sentences. The tag portion 606 displays the sentence "He knocked to see if anyone was inside," and indicates corresponding tags of "wood," "knock," and "door". A drop-down menu 610 of sound identifiers (IDs) are displayed, allowing one of the context-based sounds identified for the sentence to be selected by the user. A play button 612 allows the user to play the selected sound. An attention toggle switch 614 allows the user to select whether attention is activated or deactivated for the sentence. If attention is activated, the words that contributed most to the tags generated for the sentence (e.g., have the highest attention weights generated by the text classification module 206) are highlighted. The words can be highlighted in different manners (e.g., different intensities or brightness, different colors, etc.) depending on the attention weights generated for the words. For example, the word "knocked" may have an attention weight of 0.4, the word "anyone" may have an attention weight of 0.2, and the word "inside" may have an attention weight of 0.2. Accordingly, the words "anyone" and "inside" are highlighted with a same intensity, and the word "knocked" is highlighted with a greater intensity.

The tag portion 608 displays the sentence "As he knocked he heard screams of some child," and indicates corresponding tags of "yell," "screaming," and "squeal". Analogous to the tag portion 606, the tag portion 608 includes a drop-down menu 616 of sound IDs allowing one of the context-based sounds identified for the sentence to be selected by the user, a play button 618 that allows the user to play the selected sound, and an attention toggle switch 620 that allows the user to select whether attention for the sentence is activated or deactivated.

Although particular types of user interface elements are displayed in the example user interface 600, it should be noted that any of a variety of user interface elements can be displayed to the user, including drop-down menus, buttons, selection boxes, text entry fields, sliders, knobs, and so forth. Furthermore, user inputs can be input in other manners, such as audible inputs, gesture inputs, and so forth.

Returning to FIG. 2, in one or more implementations, the output module 136 outputs a portion of the tag information 226 as store data 230. The store data 230 includes the sound (or an identifier of the sound) that is associated with the text input 202 (e.g., automatically selected or selected by the user), an identifier of where the data for this context-based sound is located (e.g., file names or other identifiers), an identifier of the one or more words in the text input 202 to which the one or more sounds are anchored, and the text input 202. This allows the context-based sounds associated with various text inputs to be subsequently retrieved and played back when the associated text input is displayed or otherwise presented. The store data 230 can be stored in various locations, such as storage 108 of FIG. 1. The output module 136 (or another module, such as the association module 222) can generate the store data 230 in any of a variety of different manners.

For example, the store data 230 can be audio data that is a playback of the text input 202 (e.g., generated using a text to speech conversion system, by having a narrator record his or her reading of the text, etc.) incorporating the context-based sound. Additionally or alternatively, the store data 230 can include an indication of the context-based sound (e.g., a filename or location identifier of where the context-based sound can be obtained, a file or other data structure including the context-based sound, etc.), an indication of the text input 202 (e.g., the text input itself or an identifier of a location where the text input is stored), and an indication of which one or more words in the text input 202 the context-based sound is anchored to. Accordingly, when the text input is subsequently presented (e.g., displayed or played back audibly), the context-based sound can be played back at the appropriate time or volume as discussed above.

Figure 7:
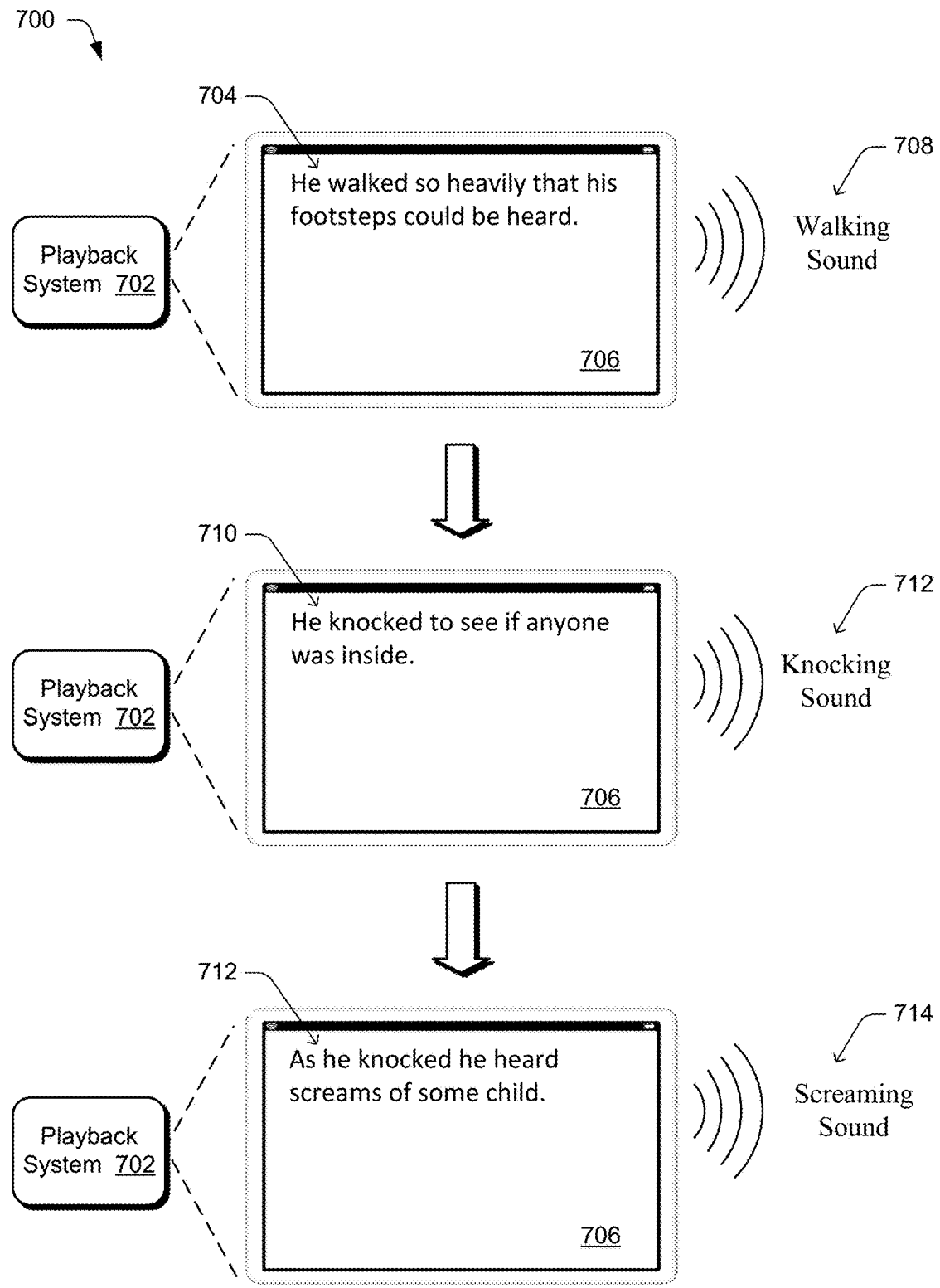
FIG. 7 illustrates an example of digital text and associated context-based sounds presented by a playback system.

FIG. 7 illustrates an example 700 of digital text and associated context-based sounds presented by a playback system 702. The playback system 702 can be implemented by any of a variety of different computing devices, analogous to the discussion above regarding computing device 102 of FIG. 1. The playback system can be, but need not be, implemented by the same computing device that includes the sound association system 104 used to associate the context-based sounds with the digital text.

In the example 700, various digital text that are sentences are displayed at different times. For example, digital text 704, the sentence "He walked so heavily that his footsteps could be heard", is displayed in a user interface 706. A walking sound 708, previously associated with the digital text 702 by the sound association system 104 discussed above, is played back (audibly output) by the playback system 702 concurrently with displaying the digital text 704.

Subsequently, digital text 710, the sentence "He knocked to see if anyone was inside", is displayed in the user interface 706. A knocking sound 712, previously associated with the digital text 710 by the sound association system 104 discussed above, is played back (audibly output) by the playback system 702 concurrently with displaying the digital text 710.

Subsequently, digital text 712, the sentence "As he knocked he heard screams of some child", is displayed in the user interface 706. A screaming sound 714, previously associated with the digital text 712 by the sound association system 104 discussed above, is played back (audibly output) by the playback system 702 concurrently with displaying the digital text 712.

Returning to FIG. 2, in the discussions herein reference is made to the text classification module 206 generating attention weights 224 that allow the context-based sound to be anchored to one or more aurally active words in the text input 202. Additionally or alternatively, if anchoring sounds to aurally active words in text input is not desired (e.g., the context-based sound is to be played at a constant or continuously decreasing volume while the text input is being presented), then the text classification module 206 need not generate attention weights 224 and the training module 206 need not include an attention layer 308.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-7.

Figure 8:
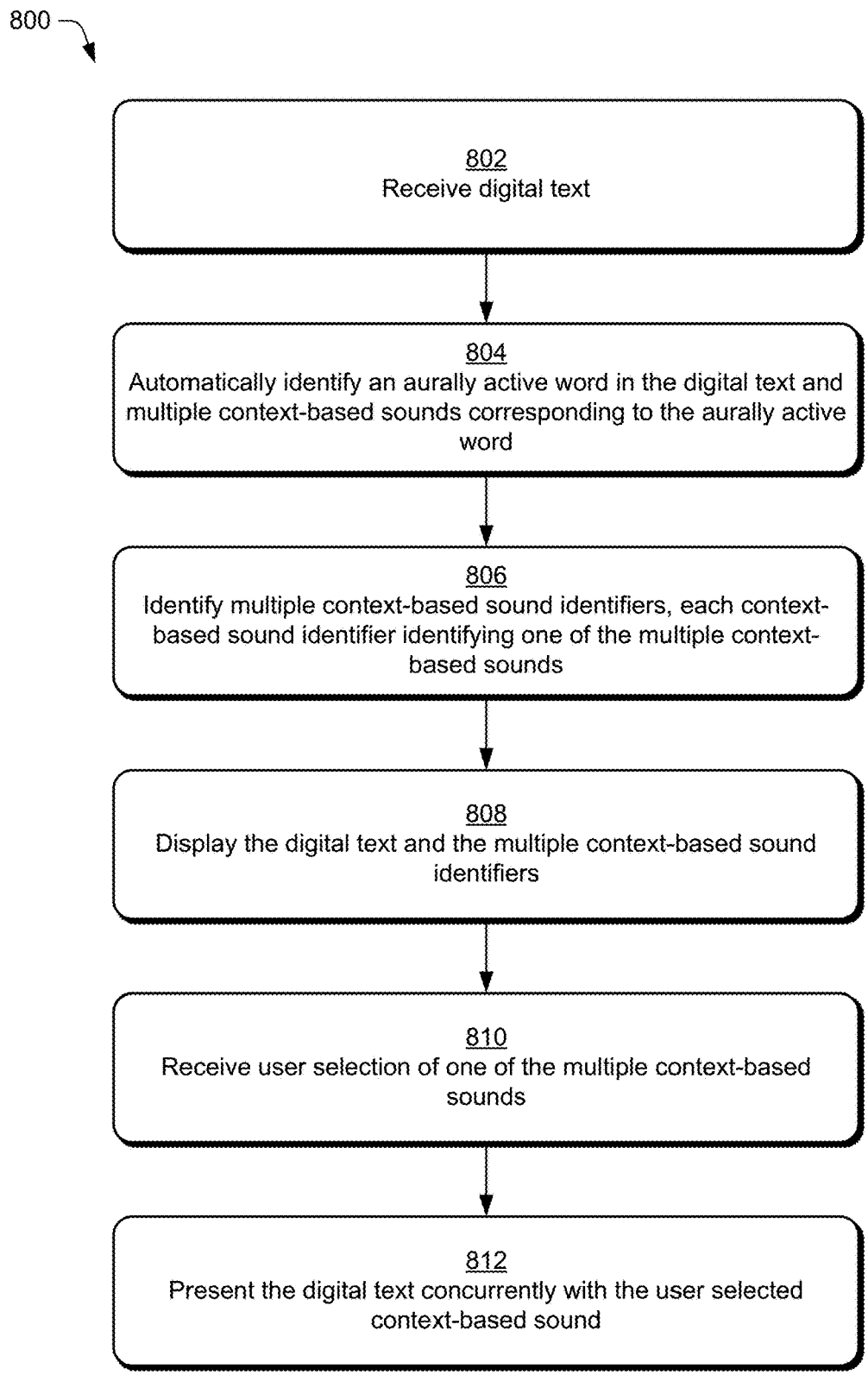
FIG. 8 is a flow diagram depicting a procedure in an example implementation of automatically associating context-based sounds with text.

FIG. 8 is a flow diagram 800 depicting a procedure in an example implementation of automatically associating context-based sounds with text. In this example, digital text is received (block 802). The digital text can be received from one or more of a variety of different sources, such as from storage 108, from a remote storage device (e.g., accessed via the network 118), from direct user input, and so forth.

An aurally active word in the digital text and multiple context-based sounds corresponding to the aurally active word in the digital text are automatically identified (block 804). This automatic identification is performed using a multimodal classification module trained on both texts and sounds as discussed above. A single aurally active word and at least one context-based sound corresponding to the aurally active word can be identified. Additionally or alternatively, multiple aurally active words can be identified and, for each of the multiple aurally active words, at least one context-based sound corresponding to the aurally active word can be identified.

Multiple context-based sound identifiers are identified, each context-based sound identifier being associated with one of the multiple context-based sounds (block 806). These sound identifiers are, for example, names or numbers identifying the multiple context-based sounds.

The digital text and the multiple context-based sound identifiers are displayed (block 808). A particular number of identifiers are displayed, such as three identifiers. The particular number of identifiers to display can be a user configuration setting.

User selection of one of the multiple context-based sounds is received (block 810). This user selection can be made in various manners, such as selection of one of the multiple context-based sound identifiers from a pull-down menu, audible command, and so forth.

The digital text is presented concurrently with the context-based sound (block 812). Presenting the digital text includes, for example, displaying the digital text or playing back (audibly outputting) the digital text (e.g., using a text to speech system or a recorded narration). Presenting the user selected context-based sound includes, for example, playing back (audibly outputting) the user selected context-based sound.

FIG. 9 is a flow diagram 900 depicting another procedure in an example implementation of automatically associating context-based sounds with text. In this example, a text classification module is trained to identify a probability of a text input corresponding to each of multiple sound tags (block 902). The text classification module is trained by minimizing a first loss function between sound tags identified by the text classification module for training data texts and training labels for the training data texts. Each sound tag corresponds to a context-based sound associated with an aurally active word or phrase of the text input.

A sound classification module is trained to identify a probability of each of multiple context-based sounds corresponding to each of the multiple sound tags (block 904). The sound classification module is trained by minimizing the first loss function between sound tags identified by the sound classification module for training data sounds and training labels for the training data sounds. These are the same multiple sound tags as the text classification module is trained to identify probabilities for.

A first embedding for the text input in an embedding space and a second embedding for a sound input in the embedding space are provided to an additional classification module (block 906). The first embedding is, for example, an output of a penultimate layer of the text classification module and the second embedding is, for example, an output of a penultimate layer of the sound classification module comprising. The first and second embedding are in the embedding space, rather than being the probability of the text input corresponding to each of the multiple sound tags or the probability of each of multiple context-based sounds corresponding to each of the multiple sound tags.

The additional classification module is trained to identify a probability of the text input corresponding to each of the multiple sound tags by minimizing a combination of a first loss to classify the text input correctly and a second loss to quantify a difference between the first embedding and the second embedding (block 908). This access control module is trained with inputs being the first embedding output by the text classification module and the second embedding output by the sound classification module.

Example System and Device

Figure 10:
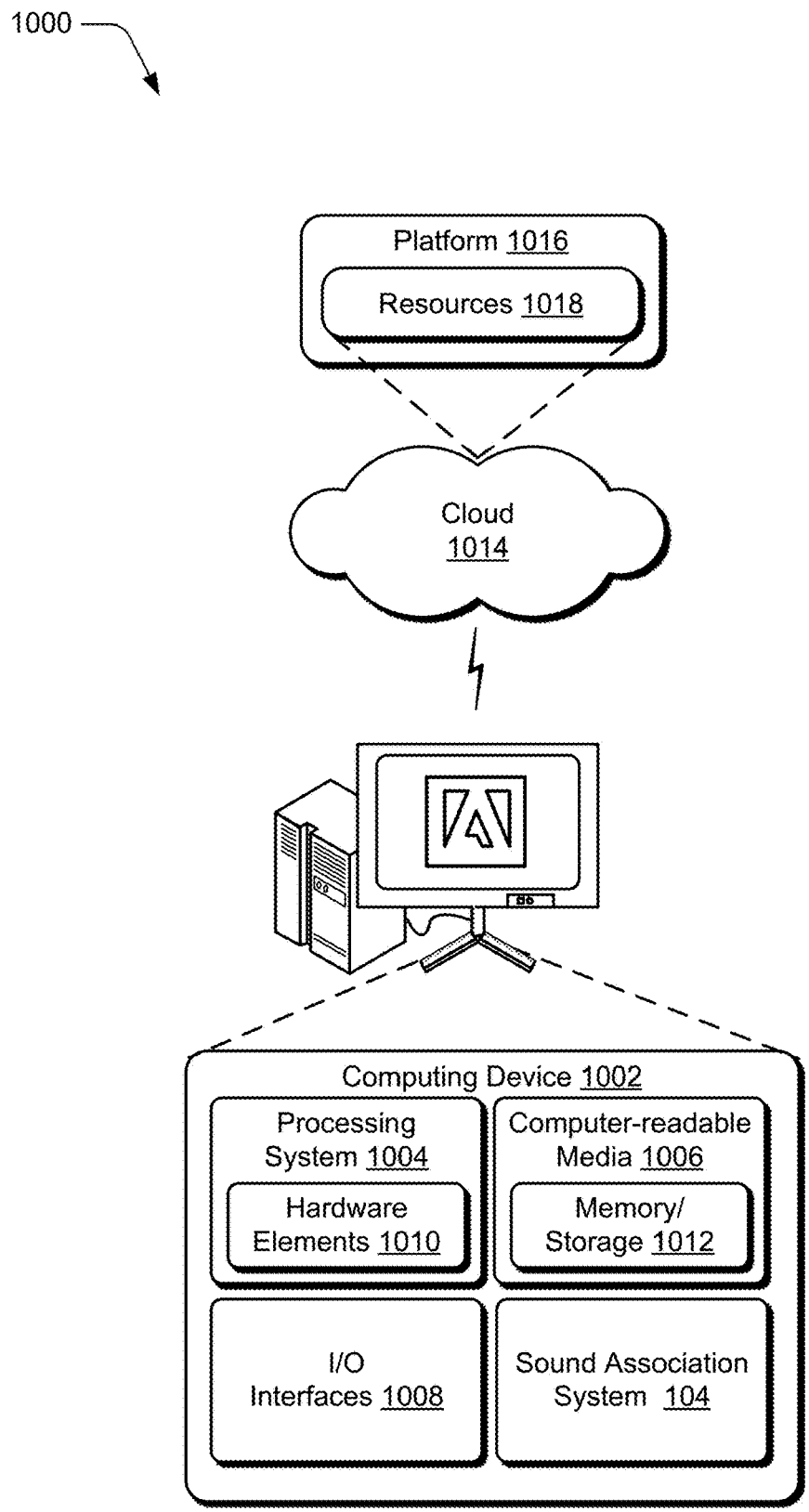
FIG. 10 illustrates an example system including various components of an example device that can be implemented as any type of computing device as described and/or utilize with reference to FIGS. 1-9 to implement aspects of the techniques described herein.

FIG. 10 illustrates an example system generally at 1000 that includes an example computing device 1002 that is representative of one or more computing systems and/or devices that may implement the various techniques described herein. This is illustrated through inclusion of the sound association system 104. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one processing device, the method comprising:
   receiving digital text;
   automatically identifying, using a text classification module of a multimodal classification module trained based on texts and sounds, an aurally active word in the digital text;
   automatically identifying multiple context-based sounds corresponding to the aurally active word in the digital text using a sound classification module implemented in a deep neural network trained to identify one or more sound tags;
   identifying multiple context-based sound identifiers based on the one or more sound tags, each context-based sound identifier being associated with one of the multiple context-based sounds;
   displaying the digital text and the multiple context-based sound identifiers;
   receiving user selection of a context-based sound of the multiple context-based sounds; and
   presenting the digital text concurrently with the context-based sound including audibly outputting the context-based sound at a higher volume during a time that the aurally active word is determined to be read than during times that the aurally active word is not determined to be read, wherein the higher volume of the context-based sound is based on an attention weight generated by the text classification module for the aurally active word to which the context-based sound is anchored.

2. The method of claim 1, wherein presenting the digital text concurrently with the context-based sound comprises audibly outputting the digital text concurrently with the context-based sound.

3. The method of claim 2, wherein audibly outputting the digital text concurrently with the context-based sound comprises audibly outputting the context-based sound at a higher volume during a time that the aurally active word is determined to be read than during times that the aurally active word is not determined to be read.

4. The method of claim 1, each of the multiple context-based sounds corresponding to one of multiple sound tags, the automatically identifying the aurally active words comprising:
   identifying attention weights generated by an attention layer of a text classification module of the multimodal classification module, the attention weights indicating how much each of the words in the digital text contributes to generation of a sound tag of the multiple sound tags by the text classification module; and
   identifying, as the aurally active word, a word in the digital text having a highest attention weight.

5. The method of claim 1, further comprising automatically identifying the multiple context-based sounds corresponding to the aurally active word by:
   generating a first set of tags by identifying a particular number of tags having a highest probability identified by an additional classification module of being ones of the multiple context-based sounds;
   generating, for each of multiple sounds, a second set of tags by identifying a particular number of tags having the highest probability identified by a sound classification module of being ones of the multiple context-based sounds;
   generating, for each of the second set of tags, a similarity score between the first set of tags and the second set of tags, the similarity score indicating the similarity of the first set of tags to the second set of tags; and
   selecting a particular number of sounds associated with the first set of tags having the second sets of tags with highest similarity scores with the first set of tags.

6. The method of claim 1, further comprising automatically identifying the multiple context-based sounds corresponding to the aurally active word by:
   generating, by a text classification module of the multimodal classification module, a first embedding in an embedding space corresponding to the digital text;
   obtaining, for each of multiple sounds, a second embedding in the embedding space having been generated by a sound classification module of the multimodal classification module;
   determining, for each of the multiple sounds, a divergence score indicating a divergence of the first embedding and the second embedding; and
   selecting a particular number of sounds having a smallest divergence score.

7. The method of claim 6, further comprising concatenating the first embedding and the second embedding.

8. The method of claim 1, wherein the text classification module generates a first embedding for the digital text in an embedding space and the sound classification module generates a second embedding for each of multiple sounds in a sound database, and wherein an additional classification module generates a probability of the digital text corresponding to each of the multiple sounds in the sound database.

9. The method of claim 1, further comprising clipping a duration of the context-based sound if the duration of the context-based sound is greater than a threshold duration.

10. The method of claim 1, further comprising repeating an audible output of the context-based sound if a duration of the context-based sound is below a threshold duration.

11. A method implemented by at least one processing device, the method comprising:
training a text classification module to identify a probability of a text input corresponding to each of multiple sound tags by minimizing a first loss function between sound tags identified by the text classification module for training data texts and training labels for the training data texts, each sound tag corresponding to a context-based sound associated with an aurally active word or phrase;
training a sound classification module implemented in a deep neural network to identify a probability of each of multiple context-based sounds corresponding to each of the multiple sound tags by minimizing the first loss function between sound tags identified by the sound classification module for training data sounds and training labels for the training data sounds;
providing an output of the text classification module and an output of the sound classification module to an additional classification module, the output of the text classification module comprising a first embedding for the text input in an embedding space rather than the probability of the text input corresponding to each of the multiple sound tags, the output of the sound classification module comprising a second embedding for a sound input in the embedding space rather than the probability of each of multiple context-based sounds corresponding to each of the multiple sound tags; and
training the additional classification module, with the first embedding and the second embedding being the inputs to the additional classification module, to identify a probability of the text input corresponding to each of the multiple sound tags by minimizing a combination of a first loss to classify the text input correctly and a second loss to quantify a difference between the first embedding and the second embedding.

12. The method of claim 11, further comprising initially training the text classification module and the sound classification module and then training the additional classification module.

13. The method of claim 12, further comprising:
training, concurrently with training the additional classification module, the text classification module and the sound classification module by minimizing the combination of the first loss and the second loss for sound tags generated by the text classification module and by minimizing the combination of the first loss and the second loss for sound tags generated by the sound classification module.

14. The method of claim 11, wherein the text input comprises a sentence.

15. The method of claim 11, wherein the second loss comprises a divergence loss between the first embedding and the second embedding.

16. The method of claim 15, wherein the first loss comprises a cross-entropy loss and the combination of the first loss and the second loss comprises a weighted combination of the first loss and the second loss.

17. A system comprising:
an input module implemented at least partially in hardware of a computing processing device to receive digital text;
means for automatically identifying, based on the digital text and multiple context-based sounds, an aurally active word in the digital text using a text classification module of a multimodal classification module and multiple context-based sounds corresponding to the aurally active word in the digital text using a sound classification module implemented in a deep neural network trained to identify one or more sound tags, each of the multiple context-based sounds having an associated context-based sound identifier based on the one or more sound tags; and
an output module implemented at least partially in the hardware of the processing device to present the digital text and context-based sound identifiers of the multiple context-based sounds, to receive user selection of a context-based sound of the multiple context-based sounds, and to present the digital text concurrently with the context-based sound, wherein the output module is to present the digital text concurrently with the context-based sound by audibly outputting the context-based sound at a higher volume during a time that the aurally active word is determined to be read than during times that the aurally active word is not determined to be read, and the higher volume of the context-based sound is based on an attention weight generated by the text classification module for the aurally active word to which the context-based sound is anchored.

18. The system of claim 17, wherein the means for automatically identifying an aurally active word comprises a multimodal classification module trained based on texts and sounds.

19. The system of claim 18, wherein the multimodal classification module is trained to minimize a combination of a cross-entropy loss and a divergence loss.

20. The system of claim 17, wherein automatically identifying the aurally active word further comprises:
identifying attention weights generated by an attention layer of a text classification module of the multimodal classification module, the attention weights indicating how much each of multiple words in the digital text contributes to identification of a sound tag of the one or more sound tags; and
identifying, as the aurally active word, a word in the digital text having a highest attention weight.

* * * * *